United States Patent
Takaki et al.

(10) Patent No.: US 9,397,602 B2
(45) Date of Patent: Jul. 19, 2016

(54) ROTARY ELECTRIC MACHINE CONTROL APPARATUS AND CONTROL METHOD FOR ROTARY ELECTRIC MACHINE

(71) Applicant: Kabushiki Kaisha Yaskawa Denki, Kitakyushu-shi (JP)

(72) Inventors: Mamoru Takaki, Kitakyushu (JP); Shinya Morimoto, Kitakyushu (JP); Aamir Noor Baloch, Kitakyushu (JP); Masaki Hisatsune, Kitakyushu (JP); Masanobu Kakihara, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 236 days.

(21) Appl. No.: 14/451,379

(22) Filed: Aug. 4, 2014

(65) Prior Publication Data
US 2015/0244298 A1  Aug. 27, 2015

(30) Foreign Application Priority Data
Feb. 25, 2014  (JP) .................. 2014-034593

(51) Int. Cl.
*H02P 21/00* (2016.01)
*H02P 21/14* (2016.01)
*H02P 6/18* (2016.01)

(52) U.S. Cl.
CPC ............. *H02P 21/146* (2013.01); *H02P 6/18* (2013.01); *H02P 6/183* (2013.01); *H02P 21/32* (2016.02)

(58) Field of Classification Search
CPC .......... H02P 21/146; H02P 21/32; H02P 6/18
USPC .................................................. 318/400.02
See application file for complete search history.

(56) References Cited

U.S. PATENT DOCUMENTS 6,462,491 B1   10/2002  Iijima et al.
2003/0006723 A1   1/2003  Sul et al.
(Continued)

FOREIGN PATENT DOCUMENTS

JP   2000-350489 A   12/2000
JP   2002-058294 A   2/2002
(Continued)

OTHER PUBLICATIONS

The English translation of Office Action for corresponding Korean Patent Application No. 10-2014-0107555 dated Nov. 23, 2015.
(Continued)

*Primary Examiner* — Erick Glass
(74) *Attorney, Agent, or Firm* — Hubbs, Enatsky & Inoue PLLC

(57) ABSTRACT

A rotary electric machine control apparatus includes: a phase estimator configured to estimate a first estimated phase value based on a rotary electric machine current; a correction value storage configured to store correction information representing a plurality of second estimated phase values and a plurality of correction values; a first phase corrector configured to acquire, based on a second estimated phase value corresponding to the first estimated phase value, from the correction information, a correction value associated with the second estimated phase value, and configured to correct the second estimated phase values based on the correction value; a position controller configured to calculate a speed command based on a position command and the corrected second estimated phase value; and a speed controller configured to calculate a torque command value and a q-axis current command value based on the speed command and the corrected second estimated phase value.

20 Claims, 7 Drawing Sheets

(56) References Cited

U.S. PATENT DOCUMENTS

| | | |
|---|---|---|
| 2004/0113582 A1 | 6/2004 | Ide |
| 2006/0125439 A1* | 6/2006 | Ajima .................... B60K 6/26 318/716 |
| 2007/0222406 A1* | 9/2007 | Atarashi ............ H02P 21/0089 318/494 |
| 2009/0256503 A1* | 10/2009 | Ueda ...................... H02P 6/06 318/400.02 |
| 2010/0207555 A1 | 8/2010 | Ide et al. |
| 2011/0199031 A1 | 8/2011 | Balazovic et al. |
| 2014/0176028 A1* | 6/2014 | Tobari .................... B60L 15/20 318/400.02 |

FOREIGN PATENT DOCUMENTS

| | | |
|---|---|---|
| JP | 2002-291283 A | 10/2002 |
| JP | 2004-254423 A | 9/2004 |
| JP | 2006-109589 A | 4/2006 |
| JP | 2010-166638 A | 7/2010 |
| JP | 2010-172080 A | 8/2010 |
| JP | 2010-259255 A | 11/2010 |

OTHER PUBLICATIONS

Xiao D et al: "Sensorless direct torque and flux control for matrixconverter IPM synchronous motor drives using adaptive sliding modeobserver combined with high frequency signal injection", Energy Conversion Congress and Exposition, 2009. ECCE.IEEE, IEEE, Piscataway, NJ, USA, Sep. 20, 2009, pp. 4000-4007, XP031888000. DOI:10.1109/ECCE.2009.5316521ISBN:978-1-4244-2893-9. Cited in the Search Report of Mar. 18, 2016 for corresponding EP application No. 14176649.3.

Holtz J et al: "Identification and Compensation of Torqueripple in High-Precision Permanent Magnet Motor Drives",IEEE Transactions on Industrial Electronics, IEEESERVICE Center, Piscataway, NJ, USA, vol. 43, No. 2, Apr. 1, 1996, pp. 309-320, XP000592584,ISSN: 0278-0046, DOI: 10.1109/41.491355. Cited in the Search Report of Mar. 18, 2016 for corresponding EP application No. 14176649.3.

Partial Translation of the Office Action of Feb. 2, 2016, for corresponding JP application No. 2014-034593.

Search Report and the European Search Opinion of Mar. 18, 2016 for corresponding EP application No. 14176649.3 to the USPTO.

* cited by examiner

FIG.9

| ESTIMATED PHASE VALUE \ TORQUE COMMAND VALUE | 0 | 30 | 60 | 90 | 120 | 150 |
|---|---|---|---|---|---|---|
| 0 | −4 | −3 | −3 | −3 | 0 | 0 |
| 1 | −3 | −2 | −3 | −6 | 0 | 0 |
| 2 | −2 | −2 | −2 | −2 | 0 | 0 |
| 3 | −2 | −2 | −2 | −2 | 0 | 0 |
| 4 | −1 | −1 | −1 | −1 | 0 | 0 |
| 5 | −1 | −1 | −1 | −1 | 0 | 0 |
| 6 | −1 | −1 | −1 | −1 | 0 | 0 |
| 7 | −1 | −1 | −1 | −1 | 0 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11 | 0 | 0 | 0 | 0 | 0 | 0 |
| 12 | 0 | 0 | 0 | 0 | 0 | 0 |
| 13 | 0 | 0 | 0 | 0 | 0 | 0 |
| 14 | 0 | 0 | 0 | 0 | 0 | 0 |
| 15 | −1 | −1 | −1 | −1 | 0 | 0 |
| 16 | −1 | −1 | −1 | −1 | 0 | 0 |
| 17 | −1 | −1 | −1 | −1 | 0 | 0 |
| 18 | −1 | −1 | −1 | −1 | 0 | 0 |
| 19 | −1 | −1 | −1 | −1 | 0 | 0 |

US 9,397,602 B2

ROTARY ELECTRIC MACHINE CONTROL APPARATUS AND CONTROL METHOD FOR ROTARY ELECTRIC MACHINE

INCORPORATION BY REFERENCE

The present application claims priority from Japanese Application JP2014-034593 filed on Feb. 25, 2014 the content to which is hereby incorporated by reference into the present application.

BACKGROUND OF THE INVENTION

1. Field of the Invention

The present invention relates to a rotary electric machine control apparatus and a control method for a rotary electric machine.

2. Description of the Related Art

There has been known a so-called motor sensorless control technology of calculating an estimated position of a rotor based on rotary electric machine currents flowing through a rotary electric machine, thereby controlling the rotary electric machine without using a physical position sensor or speed sensor. For example, JP2010-166638 A discloses a control apparatus for a rotary electric machine including control means for estimating a position of a rotor based on rotary electric machine currents flowing through the rotary electric machine detected by current detection means, and outputting a predetermined voltage command to voltage application means based on the estimated position. Specifically, the control means calculates a current command based on a torque command, and calculates a position estimation error based on the current command. Then, the control means corrects the current command based on the position estimation error, and controls the rotary electric machine based on the corrected current command and the estimated position of the rotor.

SUMMARY OF THE INVENTION

However, in the related art, the saliency, which is a change in inductance depending on the position of the rotor when the current flows through the rotary electric machine, is used for estimating the position of the rotor, and the precision of the estimated position is influenced by a change in inductance characteristics, resulting in a position estimation error. Moreover, there occurs a position estimation error depending on a position of the rotor caused by structures of the motor such as a shape of slots and a distortion of the structure.

One or more embodiments of the present invention has been made in view of the above-mentioned problems, and an object of one or more embodiments of the present invention is to provide a rotary electric machine control apparatus and a control method for a rotary electric machine capable of more precise positioning.

In one or more embodiments of the present invention, a rotary electric machine control apparatus includes: a phase estimator configured to estimate a first estimated phase value relating to an estimated phase of a rotor based on a rotary electric machine current flowing through a rotary electric machine; a correction value storage configured to store correction information representing a plurality of second estimated phase values and a plurality of correction values relating to the estimated phase in association with each other; a first phase corrector configured to acquire, based on one of the plurality of second estimated phase values corresponding to the first estimated phase value, from the correction information, one of the plurality of correction values associated with the one of the plurality of second estimated phase values, and configured to correct the one of the plurality of second estimated phase values based on the one of the plurality of correction values; a position controller configured to calculate a speed command based on a position command and the corrected second estimated phase value; and a speed controller configured to calculate one of a torque command value and a q-axis current command value based on the speed command and the corrected second estimated phase value.

In one or more embodiments of the present invention, a control method for a rotary electric machine, includes: estimating a first estimated phase value relating to an estimated phase of a rotor based on a rotary electric machine current flowing through a rotary electric machine; acquiring, based on a second estimated phase value corresponding to the first estimated phase value, from correction information storing a plurality of the second estimated phase values and a plurality of correction values in association with each other, one of the plurality of correction values associated with the second estimated phase value, and correcting the second estimated phase value based on the one of the plurality of correction values; calculating a speed command based on a position command and the corrected second estimated phase value; and calculating one of a torque command value and a q-axis current command value based on the speed command and the corrected second estimated phase value.

BRIEF DESCRIPTION OF THE DRAWINGS

FIG. 9 is a table showing an example of the correction information according to the second embodiment.

DESCRIPTION OF THE EMBODIMENTS

Figure 1:
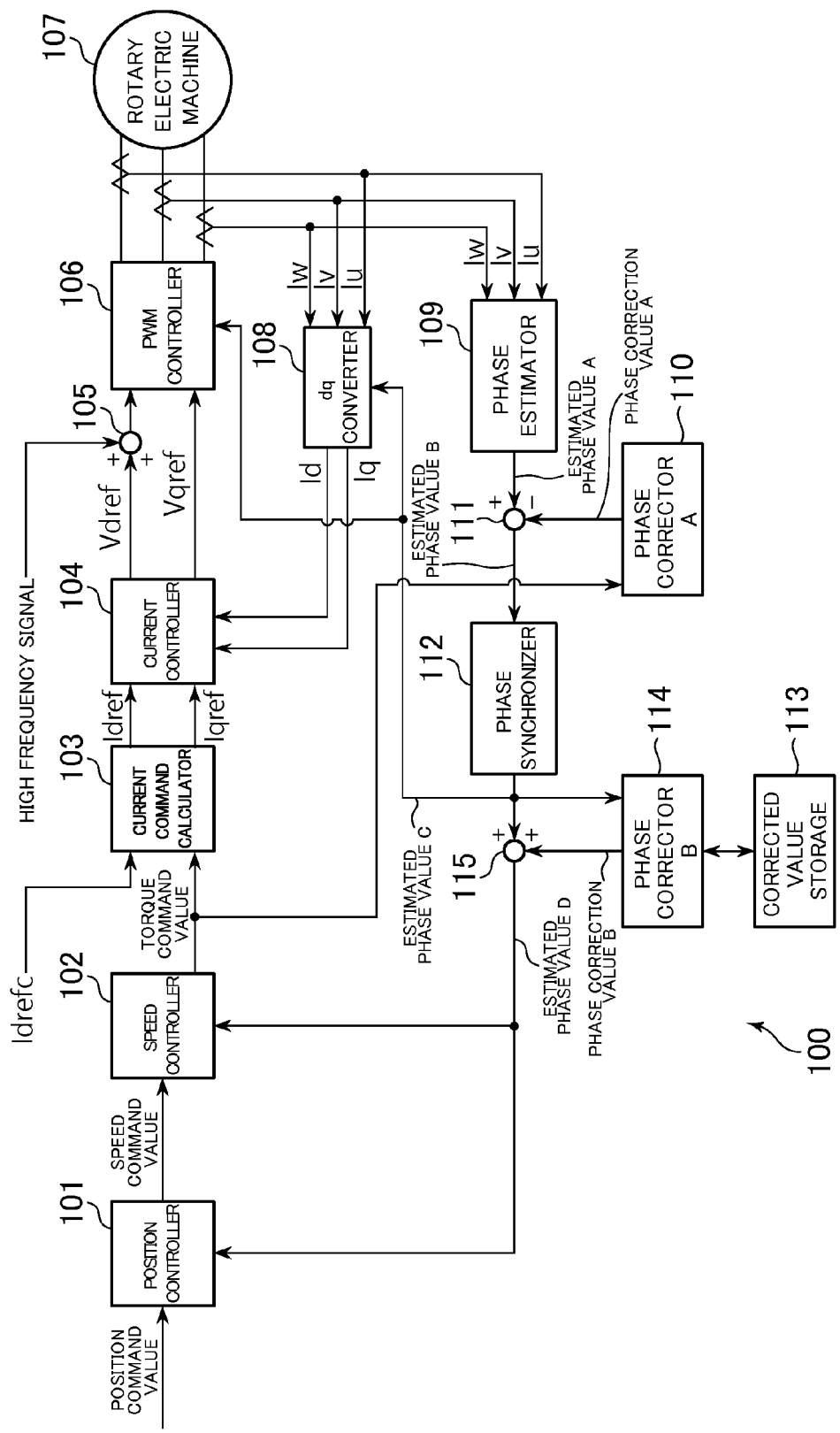
FIG. 1 is a diagram illustrating an example of an overview of a rotary electric machine control apparatus according to a first embodiment of the present invention.

Referring to the accompanying drawings, embodiments of the present invention are described below. In the drawings, the same or similar components are denoted by the same reference symbols, and repetitive description thereof is omitted.

First Embodiment

FIG. 1 is a diagram illustrating an example of an overview of a rotary electric machine control apparatus according to a first embodiment of the present invention. As illustrated in FIG. 1, a rotary electric machine control apparatus 100 includes, for example, a position controller 101, a speed controller 102, a current command calculator 103, a current controller 104, a first adder 105, a PWM controller 106, a dq converter 108, a phase estimator 109, a phase corrector A 110, a subtractor 111, a phase synchronizer 112, a correction value storage 113, a phase corrector B 114, and a second adder 115.

The position controller 101 calculates a speed command value representing a command relating to a speed based on, for example, a position command value and an estimated phase value D described later, and outputs the speed command value to the speed controller described later. The speed controller 102 calculates a torque command value based on, for example, the speed command value and the estimated phase value D described later.

The current command calculator 103 calculates a d-axis current command value (Idref) and a q-axis current command value (Iqref) based on the torque command value from the speed controller 102 and a d-axis current command correction value (Idrefc). Note that, the d-axis current command correction value (Idrefc) is calculated so as to decrease a magnetic field of a rotary electric machine 107 based on voltage command values (Vdref and Vqref) and a maximum voltage which can be output based on a voltage from a voltage source (not shown) when an amplitude value of each of the voltage command values (Vdref and Vqref) reaches the maximum voltage. Details thereof are well-known as disclosed in JP2013-17308 A and the like, and a description thereof is therefore omitted.

The current controller 104 calculates the d-axis voltage command value (Vdref) and the q-axis voltage command value (Vqref) based on, for example, the q-axis current command value (Iqref), the d-axis current command value (Idref), and current detection values (Id and Iq) in a rotating coordinate system output from the dq converter 108 described later. The first adder 105 adds, for example, a high frequency signal to the d-axis voltage command value (Vdref). Specifically, the high frequency signal is a rectangular wave voltage command which changes alternately in a positive direction and in a negative direction at each time period 2Ts in synchronous with an output of a PWM signal described later. A voltage amplitude command ΔVh changing alternately in the positive direction and in the negative direction and a phase command Δθh (not shown) are output as the high frequency signal at each time period 2Ts. Details of the current controller 104 are well-known as disclosed in JP 2010-172080 A and the like, and a description thereof is therefore omitted.

The PWM controller 106 generates the PWM signal for driving the rotary electric machine 107 based on an estimated phase value C described later, the q-axis voltage command value (Vqref), and the sum of the high frequency signal and the d-axis voltage command value (Vdref) added by the first adder 105. The rotary electric machine 107 is controlled by the PWM signal from the PWM controller 106. For example, the rotary electric machine 107 corresponds to a sensorless motor requiring no physical sensor for detecting a position of a rotor.

The dq converter 108 converts rotary electric machine currents (Iu, Iv, and Iw) flowing through the rotary electric machine 107 into the current detection values (Id and Iq) in the rotating coordinate system based on the estimated phase value C described later. Note that, the rotary electric machine currents (Iu, Iv, and Iw) are detected in synchronous with a period of one Nth (N≥1) of the time period 2Ts.

Figure 2:
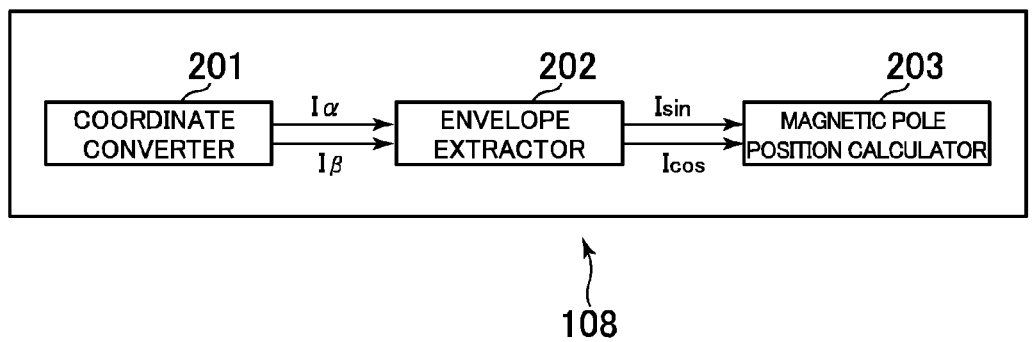
FIG. 2 is a diagram illustrating an example of a configuration of a phase estimator illustrated in FIG. 1.

The phase estimator 109 estimates an estimated phase value A representing an estimated phase of the rotor of the rotary electric machine 107 based on the rotary electric machine currents (Iu, Iv, and Iw) flowing through the rotary electric machine 107. Specifically, for example, the phase estimator 109 estimates the estimated phase value A by extracting envelopes of current detection values (Iα and Iβ) described later. More specifically, as illustrated in FIG. 2, the phase estimator 109 includes, for example, a coordinate converter 102, an envelope extractor 202, and a magnetic pole position calculator 203. The coordinate converter 201 converts the rotary electric machine currents (Iu, Iv, and Iw) into the current detection values (Iα and Iβ) in a coordinate system at rest, and outputs the current detection values to the envelope extractor 202.

Figure 3:
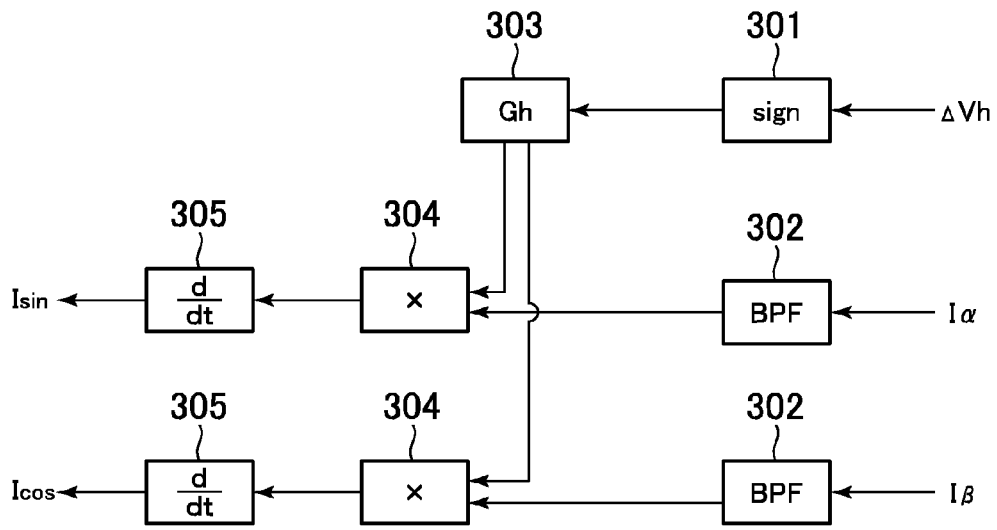
FIG. 3 is a diagram illustrating an example of an envelope detector illustrated in FIG. 2.

As illustrated in FIG. 3, the envelope extractor 202 includes, for example, a sign discriminator 301, two band-pass filters 302, a gain multiplier 303, two multipliers 304, and two differentiators 305. The band-pass filters 302 respectively remove unnecessary components from the current detection values (Iα and Iβ) from the coordinate converter 201. The sign discriminator 301 discriminates the sign of the voltage amplitude command, and outputs 1 when the sign is positive and −1 when the sign is negative. The discrimination result is multiplied by a gain by the gain multiplier 303, and is then multiplied by the respective current signals which have passed through the band-pass filters 302. In other words, the current signal which has passed through the band-pass filter 302 is full-wave rectified on the positive side, and is amplified by the gain multiplier 303. The current signals are next respectively differentiated by the differentiators 305, and current values I cos and I sin in two phases, which are envelopes, are output.

The magnetic pole position calculator 203 calculates the estimated phase value A by means of an arctangent operation applied to the current values I cos and I sin in two phases ($\tan^{-1}$ (I sin/I cos)), for example. Note that, the phase estimator 109 is well-known, and a detailed description thereof is therefore omitted. Moreover, the above-mentioned configuration of the phase estimator 109 is an example, and other configurations may be employed.

Figure 4:
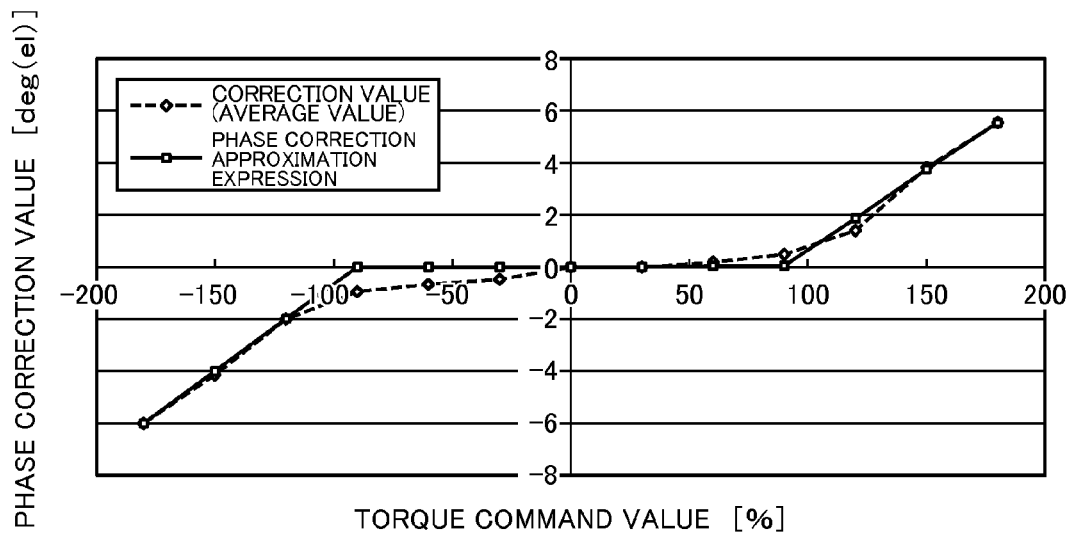
FIG. 4 is a graph showing an example of correction information according to the first embodiment.

Referring again to FIG. 1, the phase corrector A 110 outputs a phase correction value A for correcting the estimated phase value A output from the phase estimator 109, for example, when the torque command value output from the speed controller 102 satisfies predetermined criteria. Specifically, for example, as shown in FIG. 4, the phase correction value A is represented by a first-order function increasing at a predetermined gradient when the torque command value output from the speed controller 102 is equal to or more than a predetermined value (for example, 90%) and equal to or less than a predetermined value (for example, −90%). The predetermined values relating to the torque command value are values normalized, with 100% representing a nominal torque of the rotary electric machine 107, for example.

More specifically, for example, in the case shown in FIG. 4, when the torque command value is 50%, the torque command value is equal to or less than the predetermined value, and the phase correction value A (in FIG. 4, represented as phase correction value) is thus 0 (deg(el)), and when the torque command value is 150%, the torque command value is equal to or more than the predetermined value, and the phase correction value A is thus approximately 4 (deg (el)).

Note that, for example, the phase corrector A 110 may store the torque command values and the phase correction values A in association with each other as represented by a broken line in FIG. 4, and may acquire and output the phase correction value A based on the torque command value, and embodiments of the present invention are not limited to the configuration described above. Moreover, the phase corrector A 110 may output the phase correction value A for correcting the estimated phase value A output from the phase estimator 109, for example, when the q-axis current command value (Iqref) output from the speed controller 102 satisfies predetermined criteria.

The subtractor 111 subtracts the phase correction value A from the estimated phase value A output from the phase estimator 109.

Figure 5:
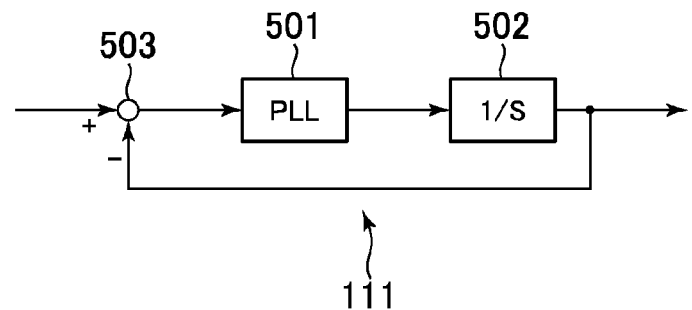
FIG. 5 is a diagram illustrating an example of a configuration of a phase synchronizer illustrated in FIG. 1.

As illustrated in FIG. 5, the phase synchronizer 112 includes, for example, a feedback circuit including a phase locked loop (PLL) circuit 501 and a first-order lag element 502, and outputs the estimated phase value C corresponding to an estimated phase value B. Specifically, in the phase synchronizer 112, a subtractor 503, the PLL circuit 501, and the first-order lag element 502 are connected in this order, an output from the first-order lag element 502 is subtracted from the estimated phase value B, and a result of the subtraction is input to the PLL circuit 501. The phase synchronizer 112 is an example, and is not limited to the configuration described above.

The correction value storage 113 stores correction information associating a plurality of estimated phase values C and a plurality of correction values with each other. Specifically, for example, the correction value storage 113 stores the plurality of estimated phase values C and the plurality of correction values in association with each other in a form of table.

The phase corrector B 114 acquires, based on the estimated phase value C from the phase synchronizer 112, the phase correction value B corresponding to the correction value associated with the estimated phase value C from the correction information stored in the correction value storage 113.

The second adder 115 outputs the estimated phase value D obtained by adding the phase correction value B acquired by the phase corrector B 114 to the estimated phase value C from the phase synchronizer 112. The estimated phase value D is input to the position controller 101 and the speed controller 102 as described above.

Here, the correction value stored in the correction value storage 113 is, for example, determined in advance in correspondence to a difference between the estimated phase value B and a phase value determined based on an actual measurement. Thus, the rotary electric machine control apparatus 100 capable of more precise positioning and the like is realized. Specifically, for example, a position estimation error based on a change in inductance characteristic caused by a magnitude of a torque command value and the like and a position estimation error depending on the position of the rotor caused by a structure of a motor such as a shape of the slots and a distortion of the structure, which occur in the related art, are prevented.

Note that, the configurations other than the phase corrector A 110, the phase corrector B 114, and the correction value storage 113, namely, the configurations of the position controller 101, the speed controller 102, the current controller 104, the PWM controller 106, the dq converter 108, the phase estimator 109, and the like are well-known as disclosed in JP 2010-172080 A, and a description of detailed configurations and operation is thus omitted. Note that, for example, the vector controller 109 in the publication corresponds to the current controller 104, and the voltage controller 111 in the publication corresponds to the PWM controller 106. Moreover, the coordinate converter 104, the envelope extractor 105, and the magnetic pole position calculator 106 in the publication respectively correspond to the coordinate converter 201, the envelope extractor 202, and the magnetic pole position calculator 203 included in the phase estimator 109. Then, an overview of the operation is described below. The result of the addition of the high frequency signal different in frequency from a drive frequency to a magnetic flux component of the voltage command value from the current controller, and a torque component from the current controller are input to the PWM controller, and the PWM controller drives the rotary electric machine 107. On this occasion, the coordinate conversion is applied to the currents supplied to the rotary electric machine by using the magnetic pole positions estimated by the dq converter, and currents obtained by removing the same frequency component as the high frequency signal from the converted currents are fed back to the current controller. Then, the current control is carried out so that the deviations from the current command values are 0.

Figure 6:
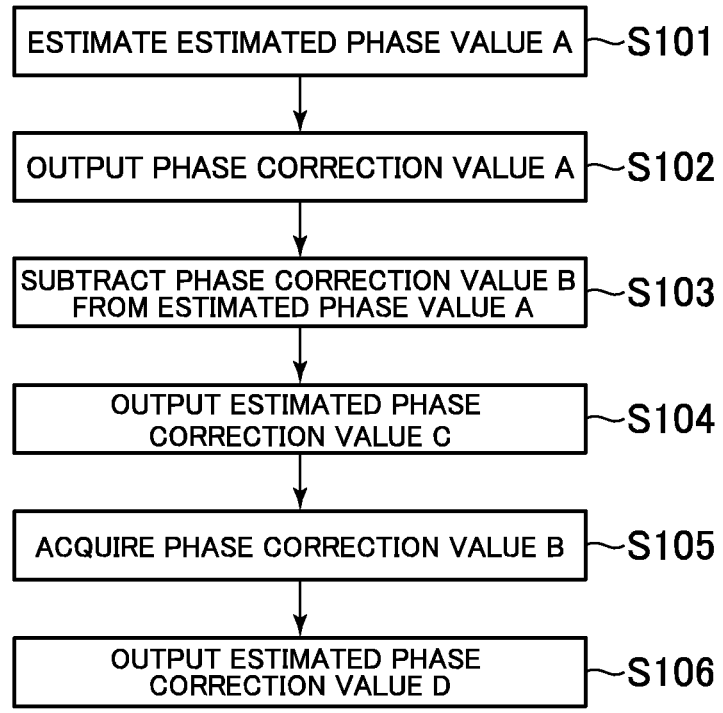
FIG. 6 is a flowchart illustrating an overview of a flow of processing relating to correction by a phase correction value A and a phase correction value B.

Referring to FIG. 6, a description is now given of an overview of a flow of processing relating to the correction by the phase correction value A and the phase correction value B of the rotary electric machine control apparatus 100 according to this embodiment. Details of the functions and processing of the respective parts of the rotary electric machine control apparatus 100 are as described above, and a description is thus mainly given below of the overview of the flow of the processing relating to the correction by the phase correction value A and the phase correction value B of the rotary electric machine control apparatus 100.

The phase estimator 109 estimates the estimated phase value A representing the estimated phase of the rotor of the rotary electric machine 107 based on the rotary electric machine currents (Iu, Iv, and Iw) flowing through the rotary electric machine 107 (S101). For example, when the torque command value output from the speed controller 102 satisfies the predetermined criteria, the phase corrector A 110 outputs the phase correction value A for correcting the estimated phase value A output from the phase estimator 109 (S102). The subtractor 111 subtracts the phase correction value A from the estimated phase value A output from the phase estimator 109 (S103). The phase synchronizer 112 outputs the estimated phase value C corresponding to the estimated phase value B obtained by subtracting the phase correction value A from the estimated phase value A (S104). The phase corrector B 114 acquires the phase correction value B corresponding to the correction value associated with the estimated phase value C from the correction information stored in the correction value storage 113 based on the estimated phase value C from the phase synchronizer 112 (S105). The second adder 115 outputs the estimated phase value D obtained by adding the phase correction value B acquired by the phase corrector B 114 to the estimated phase value C from the phase synchronizer 112 (S106).

A description has been given of the flow from the estimation of the estimated phase value A to the acquisition of the estimated phase value D. The estimated phase value D is then fed back to the position controller 101 and the speed controller 102, to thereby control, as described above, the rotary electric machine 107 by the position controller 101, the speed controller 102, the current command calculator 103, the current controller 104, the first adder 105, the PWM controller 106, and the like.

The present invention is not limited to the above-mentioned embodiment, and may be replaced by substantially the same configuration, a configuration which provides the same actions and effects, or a configuration which achieves the same objects as the configuration described in the embodiment. For example, specific configurations such as the phase estimator 109 and the phase synchronizer 112 are merely examples, and the configurations are not limited thereto. The calculation of the estimated phase value A is not limited to the form in which the high frequency component is superimposed on the d-axis voltage command value (Vdref), thereby extracting the envelopes. For example, the calculation may be performed by a method of applying an alternating voltage (or alternating current), and estimating the magnetic pole positions based on a parallel component and an orthogonal component of the rotary electric machine currents corresponding to the alternating voltage, a method of using a carrier wave frequency component of the PWM control, thereby estimating the magnetic pole positions at a low speed including a stop state, and a method of detecting the currents of the motor while changing the applied voltages at each predetermined period of the carrier wave, and acquiring a vector of the current change amounts at the each predetermined period, thereby estimating the magnetic pole positions.

Second Embodiment

A description is now given of a second embodiment of the present invention. This embodiment is different from the first embodiment in that the phase corrector B 114 acquires the phase correction value B from the correction value storage 113 based on the torque command value, and corrects the estimated phase value C. Note that, the same points as those of the first embodiment are not described below.

Figure 7:
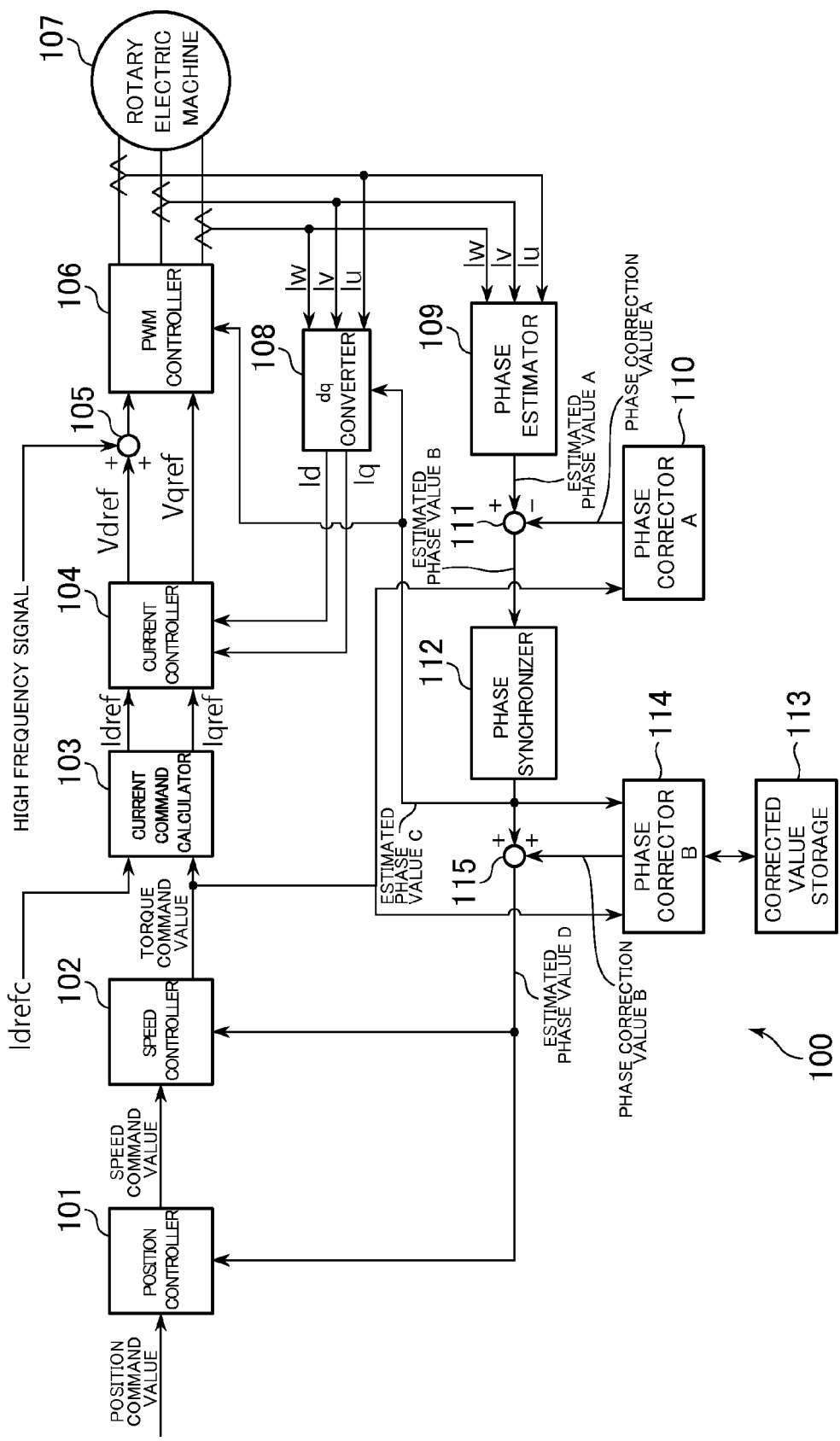
FIG. 7 is a diagram illustrating an example of an overview of a power conversion circuit according to a second embodiment of the present invention.

FIG. 7 is a diagram illustrating an example of an overview of a power conversion circuit according to a second embodiment of the present invention. As illustrated in FIG. 7, a rotary electric machine control apparatus 100 according to this embodiment includes, as described for the first embodiment, for example, the position controller 101, the speed controller 102, the current controller 104, the first adder 105, the PWM controller 106, the dq converter 108, the phase estimator 109, the phase corrector A 110, the subtractor 111, the phase synchronizer 112, the correction value storage 113, the phase corrector B 114, and the second adder 115.

Figure 8:
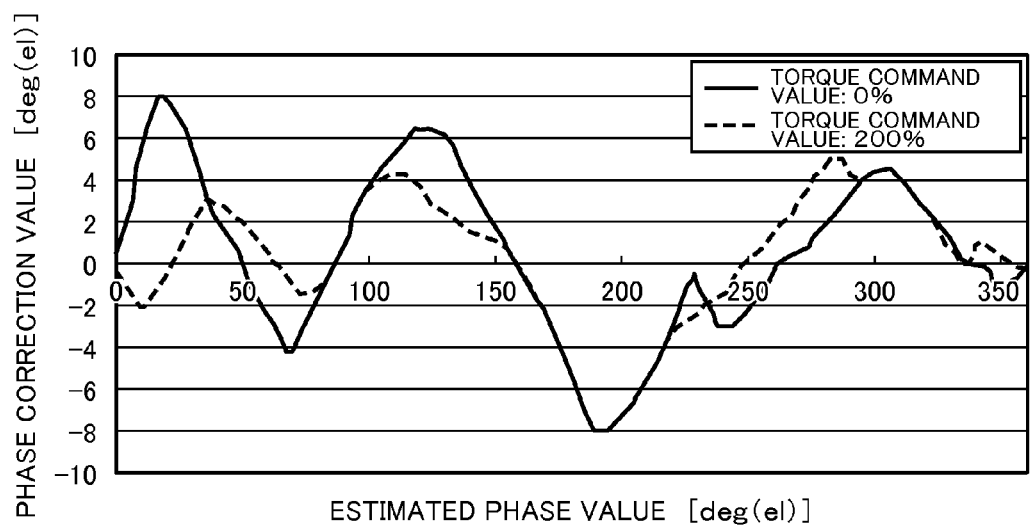
FIG. 8 is a graph showing an example of correction information according to the second embodiment.

In this embodiment, the correction value storage 113 further associates and stores the torque command values, different from the first embodiment. In other words, for example, the correction value storage 113 stores correction information associating the plurality of estimated phase values C, the plurality of correction values, and a plurality of torque command values with one another. Specifically, for example, as shown in FIG. 8 or 9, the correction value storage 113 stores the torque command value, the estimated phase (estimated phase value C), and the correction value representing the phase correction amount in association with one another. Note that, FIG. 9 shows only a part of the correction information for the sake of simplified illustration. In FIGS. 8 and 9, and the like, the torque command values are shown, but the q-axis current command values (Iqref) or the like may be used in place of the torque command values as described above.

The phase corrector B 114 calculates, based on the estimated phase value C from the phase synchronizer 112 and the torque command value from the speed controller 102, the phase correction value B corresponding to the correction value associated with the estimated phase value C from the correction information stored in the correction value storage 113.

Specifically, for example, a description is given of the case shown in FIG. 9 where the estimated phase value C input to the phase corrector B 114 is 0.5 deg(el) and the torque command value is 15%. In this case, the phase corrector B 114 acquires respective correction values in cases where the estimated phase values C are 0 deg(el) and 1 deg(el) and the torque command values are 0% and 30%. Note that, FIG. 9 shows only a part of the correction information for the sake of simplified illustration. Moreover, for the sake of simplification of the description, the correction value when the estimated phase value C is 0 deg(el) and the torque command value is 0% is referred to as data A (−4); the correction value when the estimated phase value C is 1 deg(el) and the torque command value is 0%, data B (−3); the correction value when the estimated phase value C is 0 deg(el) and the torque command value is 30%, data C (−3); and the correction value when the estimated phase value C is 1 deg(el) and the torque command value is 30%, data D (−2), and a specific description is now given thereof.

In this case, the phase correction value B (represented as the phase correction amount in Expression (3)) is calculated by using the correction information shown in FIG. 9 by means of Expressions (1) to (3).

$$X = \frac{(\text{DATA } B - \text{DATA } A)}{\left(^1\!\left(\substack{ESTIMATED\\PHASE}\right) - ^0\!\left(\substack{ESTIMATED\\PHASE}\right)\right)} \times \left(^{0.5}\!\left(\substack{ESTIMATED\\PHASE}:INPUT\right) - ^0\!\left(\substack{ESTIMATED\\PHASE}\right)\right) + \text{DATA } A \quad (1)$$

$$Y = \left\{ \frac{(\text{DATA } C - \text{DATA } A)}{\left(^{30}\!\left(\substack{TORQUE\\COMMAND}\right) - ^0\!\left(\substack{TORQUE\\COMMAND}\right)\right)} \times \frac{\left(^1\!\left(\substack{ESTIMATED\\PHASE}\right) - ^{0.5}\!\left(\substack{ESTIMATED\\PHASE}:INPUT\right)\right)}{\left(^1\!\left(\substack{ESTIMATED\\PHASE}\right) - ^0\!\left(\substack{ESTIMATED\\PHASE}\right)\right)} + \frac{(\text{DATA } D - \text{DATA } B)}{\left(^{30}\!\left(\substack{TORQUE\\COMMAND}\right) - ^0\!\left(\substack{TORQUE\\COMMAND}\right)\right)} \times \left(^1\!\left(\substack{FIXED\\VALUE}\right) - \frac{\left(^1\!\left(\substack{ESTIMATED\\PHASE}\right) - ^{0.5}\!\left(\substack{ESTIMATED\\PHASE}:INPUT\right)\right)}{\left(^1\!\left(\substack{ESTIMATED\\PHASE}\right) - ^0\!\left(\substack{ESTIMATED\\PHASE}\right)\right)} \right) \right\} \times \left(^{15}\!\left(\substack{TORQUE\\COMMAND}:INPUT\right) - ^0\!\left(\substack{TORQUE\\COMMAND}\right)\right) \quad (2)$$

PHASE CORRECTION AMOUNT = $X + Y$ [deg(el)] (3)

A description has been given of the case where the phase correction value B (phase correction amount) is calculated by means of a so-called linear interpolation in Expressions (1) to (3), but the phase correction value B may be calculated by other methods.

The second adder 115 outputs the estimated phase value D obtained by adding the phase correction value B calculated by the phase corrector B 114 to the estimated phase value C from the phase synchronizer 112.

The phase correction value B is, for example, determined in advance in correspondence to a difference between the estimated phase value B and the phase value determined based on the actual measurement as described for the first embodiment. Moreover, the phase correction value B is stored further in association with each of the torque command values in this embodiment. Thus, the correction corresponding to the torque command value is carried out, and the rotary electric machine control apparatus 100 and the like capable of more precise positioning than that according to the first embodiment is realized.

The present invention is not limited to the above-mentioned embodiments, and may be replaced by substantially the same configuration, a configuration which provides the same operations and effects, or a configuration which achieves the same objects as the configurations described in the embodiments. For example, a description has been given of the case where the estimated phase value D is fed back to the position controller 101 and the speed controller 102, but the estimated phase value D may be fed back only to the position controller 101, for example.

Moreover, in each of the first and second embodiments, a description has been given of the cases where the phase correction value A is calculated in correspondence to the torque command value, but the phase correction value A may be calculated in correspondence to the q-axis current command value. Moreover, in the second embodiment, the phase correction value B may be calculated in correspondence to the q-axis current command value in place of the torque command value.

Note that, for example, a phase estimator recited in the claims corresponds to the phase estimator 109, and a first phase corrector recited in the claims corresponds to the phase corrector B 114 and the second adder 115. Moreover, for example, a first estimated phase value recited in the claims corresponds to the estimated phase value A, and a second estimated phase value recited in the claims corresponds to the estimated phase value C.

It should be understood by those skilled in the art that various modifications, combinations, sub-combinations and alterations may occur depending on design requirements and other factors insofar as they are within the scope of the appended claims or the equivalents thereof.

What is claimed is:

1. A rotary electric machine control apparatus comprising:
    a phase estimator configured to estimate a first estimated phase value relating to an estimated phase of a rotor based on a rotary electric machine current flowing through a rotary electric machine;
    a correction value storage configured to store correction information representing a plurality of second estimated phase values and a plurality of correction values relating to the estimated phase in association with each other;
    a first phase corrector configured to acquire, based on one of the plurality of second estimated phase values corresponding to the first estimated phase value, from the correction information, one of the plurality of correction values associated with the one of the plurality of second estimated phase values, and configured to correct the one of the plurality of second estimated phase values based on the one of the plurality of correction values;
    a position controller configured to calculate a speed command based on a position command and the corrected second estimated phase value; and
    a speed controller configured to calculate one of a torque command value and a q-axis current command value based on the speed command and the corrected second estimated phase value.

2. The rotary electric machine control apparatus according to claim 1, wherein the correction information is determined in correspondence to a difference between the second estimated phase value and a phase value determined based on an actual measurement.

3. The rotary electric machine control apparatus according to claim 1, wherein:
    the correction information storage stores the correction information for one of each torque command value and each q-axis current command value; and
    the first phase corrector acquires, based on the second estimated phase value and one of the torque command value and the q-axis current command value, the correction value from the correction information, and corrects the second estimated phase value based on the correction value.

4. The rotary electric machine control apparatus according to claim 1, further comprising:
    a second phase corrector configured to correct the first estimated phase value in correspondence to one of the torque command value and the q-axis current command value.

5. The rotary electric machine control apparatus according to claim 4, wherein the second phase corrector corrects the first estimated phase value when one of the torque command value and the q-axis current command value is equal to or more than a predetermined reference.

6. The rotary electric machine control apparatus according to claim 4, further comprising:
    a phase synchronizer configured to output the second estimated phase value corresponding to the first estimated phase value corrected by the second phase corrector.

7. The rotary electric machine control apparatus according to claim 6, wherein the phase synchronizer comprises a feedback circuit including a phase-locked loop circuit and a first-order lag element.

8. The rotary electric machine control apparatus according to claim 1, further comprising:
    a dq converter configured to convert, based on the second estimated phase value, a current value of the rotary electric machine current into a current value in a rotating coordinate system.

9. The rotary electric machine control apparatus according to claim 1, further comprising a pulse-width modulation controller configured to generate, based on the second estimated phase value, a PWM signal for driving the rotary electric machine.

10. A control method for a rotary electric machine, comprising:
    estimating a first estimated phase value relating to an estimated phase of a rotor based on a rotary electric machine current flowing through a rotary electric machine;
    acquiring, based on a second estimated phase value corresponding to the first estimated phase value, from correction information storing a plurality of the second estimated phase values and a plurality of correction values in association with each other, one of the plurality of correction values associated with the second estimated phase value, and correcting the second estimated phase value based on the one of the plurality of correction values;
    calculating a speed command based on a position command and the corrected second estimated phase value; and
    calculating one of a torque command value and a q-axis current command value based on the speed command and the corrected second estimated phase value.

11. The rotary electric machine control apparatus according to claim 2, wherein:
    the correction information storage stores the correction information for one of each torque command value and each q-axis current command value; and
    the first phase corrector acquires, based on the second estimated phase value and one of the torque command value and the q-axis current command value, the correction value from the correction information, and corrects the second estimated phase value based on the correction value.

12. The rotary electric machine control apparatus according to claim 2, further comprising:

a second phase corrector configured to correct the first estimated phase value in correspondence to one of the torque command value and the q-axis current command value.

13. The rotary electric machine control apparatus according to claim 3, further comprising:
a second phase corrector configured to correct the first estimated phase value in correspondence to one of the torque command value and the q-axis current command value.

14. The rotary electric machine control apparatus according to claim 2, further comprising:
a dq converter configured to convert, based on the second estimated phase value, a current value of the rotary electric machine current into a current value in a rotating coordinate system.

15. The rotary electric machine control apparatus according to claim 3, further comprising:
a dq converter configured to convert, based on the second estimated phase value, a current value of the rotary electric machine current into a current value in a rotating coordinate system.

16. The rotary electric machine control apparatus according to claim 4, further comprising:
a dq converter configured to convert, based on the second estimated phase value, a current value of the rotary electric machine current into a current value in a rotating coordinate system.

17. The rotary electric machine control apparatus according to claim 5, further comprising:
a dq converter configured to convert, based on the second estimated phase value, a current value of the rotary electric machine current into a current value in a rotating coordinate system.

18. The rotary electric machine control apparatus according to claim 6, further comprising:
a dq converter configured to convert, based on the second estimated phase value, a current value of the rotary electric machine current into a current value in a rotating coordinate system.

19. The rotary electric machine control apparatus according to claim 7, further comprising:
a dq converter configured to convert, based on the second estimated phase value, a current value of the rotary electric machine current into a current value in a rotating coordinate system.

20. A rotary electric machine control apparatus comprising:
a phase estimation means configured to estimate a first estimated phase value relating to an estimated phase of a rotor based on a rotary electric machine current flowing through a rotary electric machine;
a correction value storage means configured to store correction information representing a plurality of second estimated phase values and a plurality of correction values relating to the estimated phase in association with each other;
a first phase correction means configured to acquire, based on one of the plurality of second estimated phase values corresponding to the first estimated phase value, from the correction information, one of the plurality of correction values associated with the one of the plurality of second estimated phase values, and configured to correct the one of the plurality of second estimated phase values based on the one of the plurality of correction values;
a position control means configured to calculate a speed command based on a position command and the corrected second estimated phase value; and
a speed control means configured to calculate one of a torque command value and a q-axis current command value based on the speed command and the corrected second estimated phase value.

* * * * *